Feb. 23, 1932.  H. H. McKEE  1,846,744
BEEF CHILLING SUPPORT
Filed Oct. 6, 1928  3 Sheets-Sheet 1
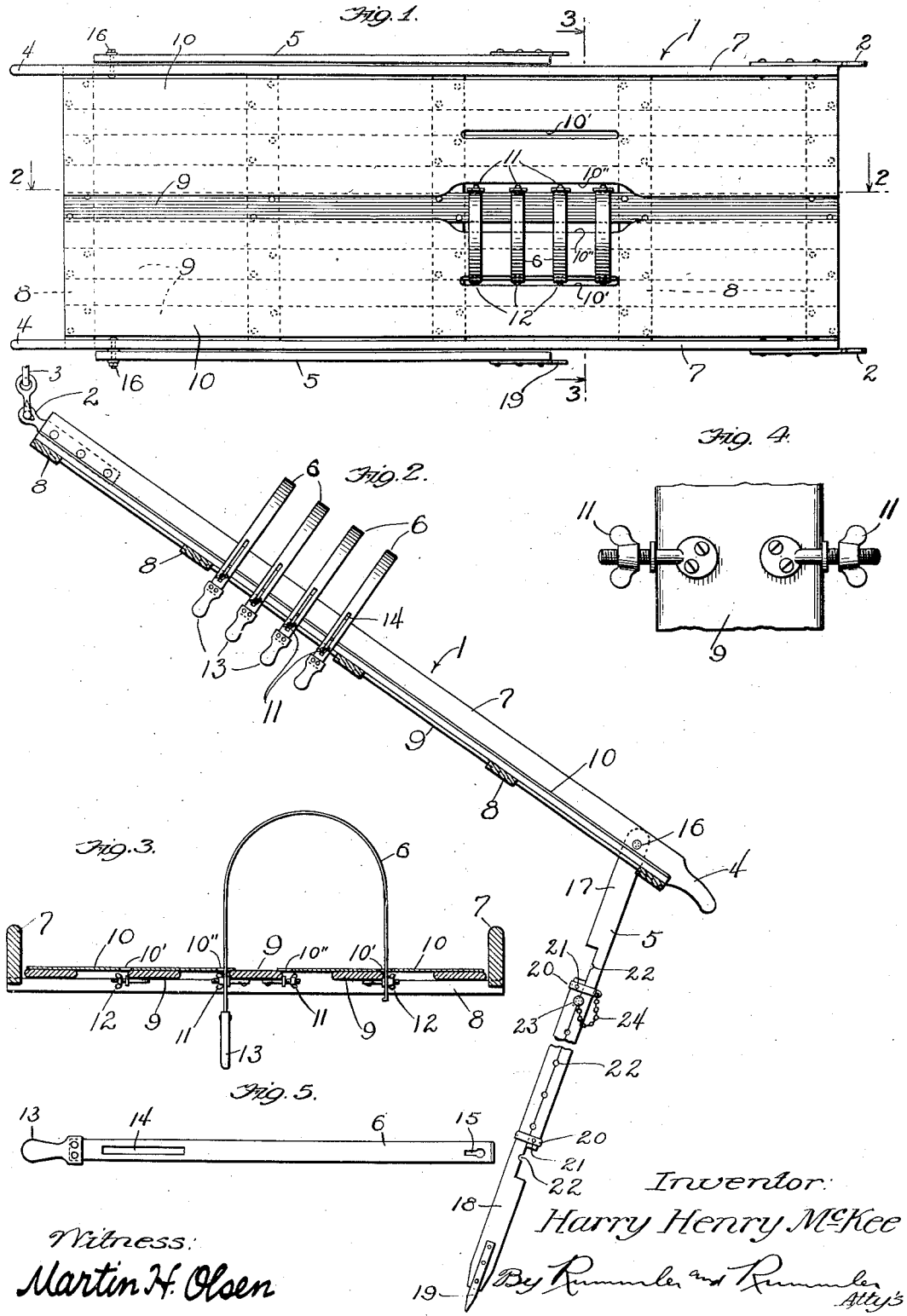
Witness:
Martin H. Olsen
Inventor:
Harry Henry McKee
By Rummler and Rummler
Atty's Feb. 23, 1932.                H. H. McKEE                1,846,744
                           BEEF CHILLING SUPPORT
                   Filed Oct. 6, 1928    3 Sheets-Sheet 2
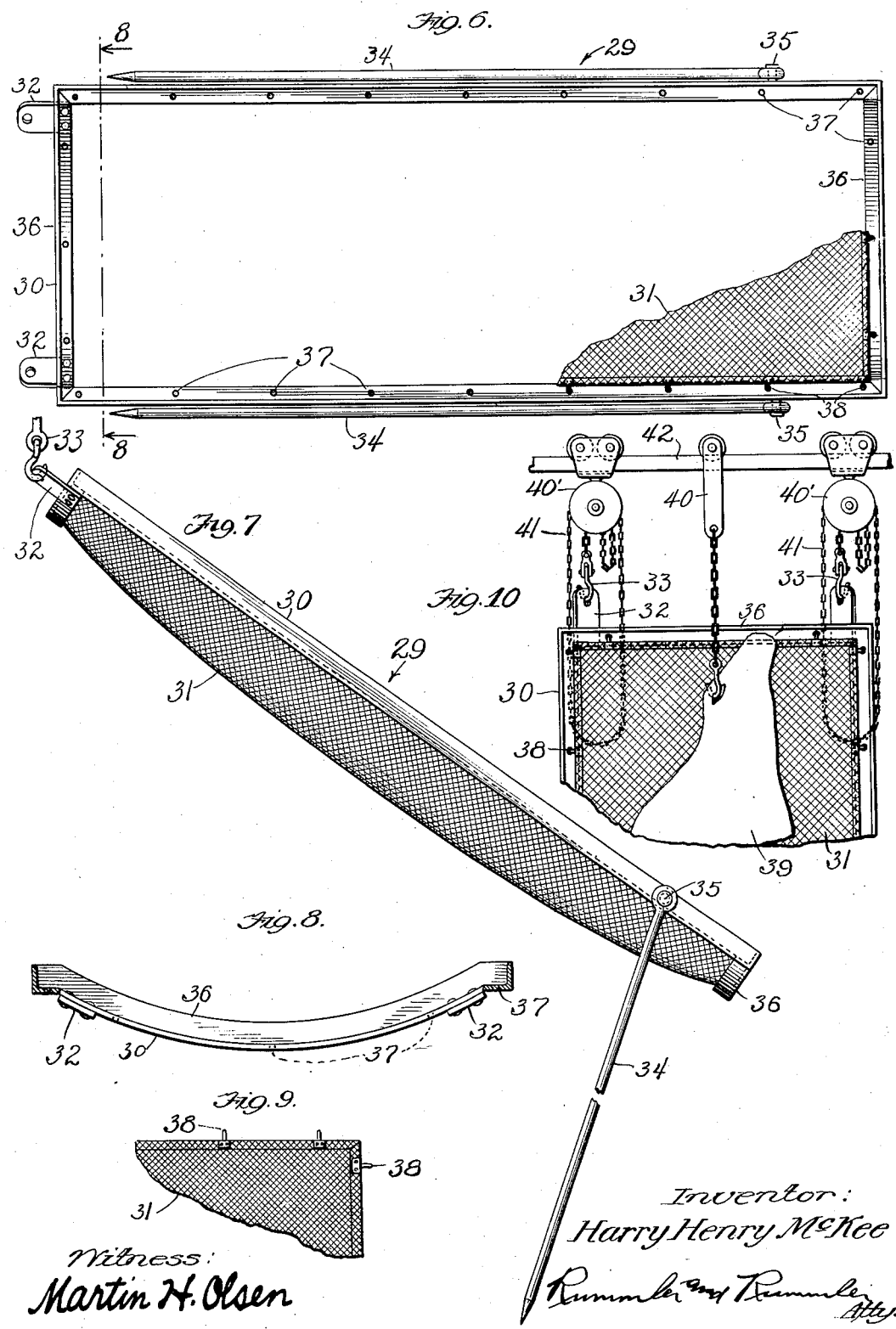

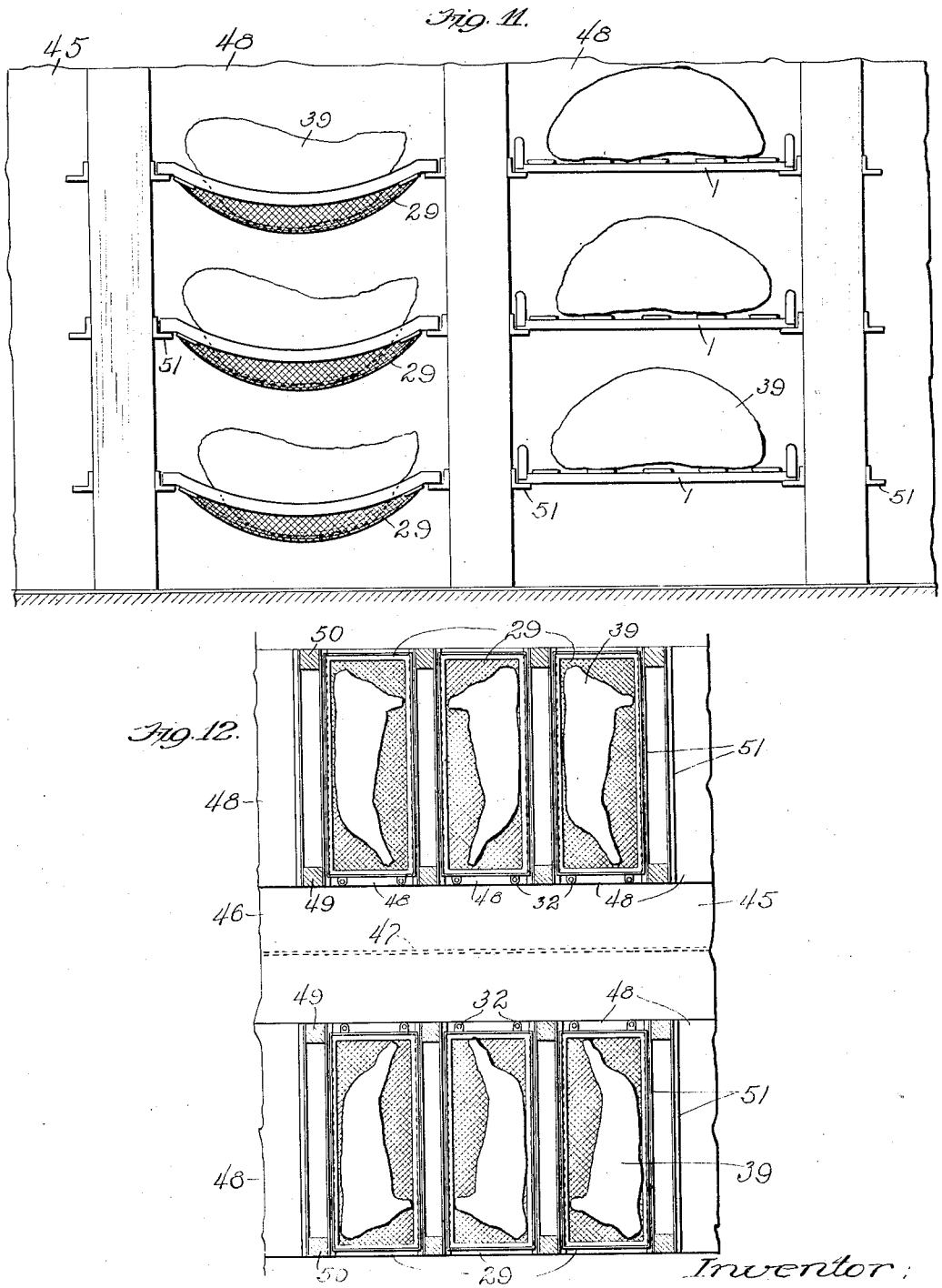

Patented Feb. 23, 1932

1,846,744

UNITED STATES PATENT OFFICE

HARRY H. McKEE, OF CHICAGO, ILLINOIS, ASSIGNOR TO SWIFT & COMPANY, OF CHICAGO, ILLINOIS, A CORPORATION OF ILLINOIS

BEEF CHILLING SUPPORT

Application filed October 6, 1928. Serial No. 310,864.

This invention relates to the handling and positioning of beef carcasses incident to chilling the same, as conducted in packing houses; and more especially to means for holding sides of beef in various predetermined positions while chilling. Heretofore the most general method of handling beef for chilling has been to suspend the sides endwise from the hind leg, as a result of which they become stretched and distorted. This causes a strained, elongated and unnatural appearance and condition of certain "cuts" and tends to toughen the meat, especially in the hind quarters, loin and flank. Moreover, the stretched and hollowed flank, commonly resultant from the old method, renders a side less attractive and less marketable, as a whole, than a relatively full and more natural appearing flank. Furthermore, in handling sides of beef it is desirable to avoid bending or breaking the back part, as by lifting one end of an unsupported side.

The main objects of this invention are to provide an improved form of individual support, table, hammock, or rack, adapted for holding sides of beef in the desired position and shape while being chilled and thereby set in a substantially rigid form ready for the market; to provide such a device adapted to operate in part at least as a traveling hanger; to provide a unit holder such as referred to adapted for tilting the beef either or both endwise and sidewise, according to the particular effect desired as to the form and limited molding of the meat form; to provide such a holder of light construction and of open, ventilated and sanitary design; and to provide a convenient and flexibly operated method and means of the character described with a view to enhancing the value of the beef product, economizing labor and minimizing space used while chilling the beef.

Certain illustrative embodiments of this invention are shown by the accompanying drawings, in which:

Figure 1 is a plan of a chilling rack or table for beef sides.

Figure 2 is a section on the line 2—2 of Fig. 1, but with the table tilted endwise at an angle of about 45 degrees.

Figure 3 is an enlarged section on the line 3—3 of Fig. 1.

Figure 4 is a much enlarged detail plan of a pair of form strap retaining clamps.

Figure 5 is a plan of one of the form-slats or straps shown in Figs. 2 and 3, laid out flat.

Figure 6 is a plan of a modified or "cradle" form of support.

Figure 7 is a side view of the device of Fig. 6 disposed at an angle instead of horizontally.

Figure 8 is an enlarged section on the line 8—8 of Fig. 6.

Figure 9 represents one corner of an interchangeable fabric web or filler for the frame shown in Fig. 6.

Figure 10 is a side view of the device of Figs. 6 and 7 suspended vertically beside a similarly supported side of beef ready for swinging into the position shown in Fig. 7.

Figure 11 is a side elevation of the interior of a chilling room having compartments and slideways to receive holders such as shown in Figs. 1 and 6.

Figure 12 is a plan or a medial part of a chilling room such as shown in Fig. 11, with cells or receiving compartments on both sides of a central passageway and trolley rail, the latter being shown in dotted outline.

Referring first to the embodiment shown in Figs. 1 to 5 inclusive, the table 1 is of oblong rectangular shape corresponding substantially with the form required to accommodate a side of beef, split side down, shoulder end to the left and back to the rear, with the flank supported on the strap forms to be described. It is provided at the corner on one end with outstanding eye members 2 for suspension by means of a beef hook or chain 3 from an overhead truck and rail, such for instance as shown in Fig. 10. The other end of the rack is provided with handles 4 and with pivoted and adjustably extensible legs 5, the latter serving to adjust the inclination or tilt of the rack when positioned at an incline as for instance as shown in Fig. 2. In order to support the flank when a side of beef is disposed on the table, split side down, a plurality of adjustable upstanding rib-like straps or bow members 6 are provided.

More in detail the construction of the table includes a pair of side rails 7, cross bars 8, floor strips 9 and a pair of interchangeable fabric lining sheets 10 each extending approximately from the corresponding side rail to the center line of the table. It is to be understood that these sets may be secured detachably in any manner desired, though no particular form of fastener is here shown.

Referring to Figs. 1 and 3, the rack includes five floor strips 9 mutually spaced apart, about the width of each strip. The middle floor strip is provided with four clamps 11 on each side, somewhat toward the right as viewed in Fig. 1, to accommodate the adjustable free ends of the straps or ribs 6 in due relation to the flank of the beef side to be placed on the table. The next adjacent strips on their outer edges, in corresponding position, are provided with clamps 12, of similar design, engaging the fixed ends of said straps. Each strap 6 has a handle 13 on its free end, and is formed with a slot 14 adjacent thereto to receive the clamp 11. The fixed end has an aperture 15 to receive this clamp 12. Each sheet 10 has an oblong slit or aperture 10' opposite the position of the flank supporting straps 6 to accommodate the outer ends thereof. The inner ends are accommodated by the inner edge recesses 10''.

Each leg 5 is provided at its upper end with a pivot 16 to accommodate swinging connection to the side of rack 1, the pivot being disposed crosswise of the rail 7 and the leg being disposed on the outer side of the latter. Each leg comprises an upper pivoted section 17 and a lower foot section 18, the latter being provided with a sharp metallic shoe or brad 19 to facilitate ground bearing adjustment and prevent slipping. These two sections are formed to overlap and are provided with a pair of similar guide rings 20 secured to the ends of the overlapping parts, as by means of pins 21. The overlapping parts are also provided with complementary transverse grooves 22 arranged in a series on each section and adapted when disposed in registry to receive a locking pin 23 secured by a chain 24 to one of the guide rings 20 so as to prevent accidental misplacement and loss. The legs when not in use may be folded up beside the rails 7.

In using the above described rack 1, the side of beef while still suspended by the hind leg from an overhead trolley (see Fig. 10) is placed against the rack which is held vertically against the split side of the beef, the flank supporting straps 6 having previously been set to accommodate either a right or left side of beef, whichever is to be applied. Then the rack, still supported by the overhead trolley, and the beef, not shown, also being supported in part thereby, is placed in a more or less inclined position such as illustrated in Fig. 2. Moreover the rack may be tipped sidewise somewhat if desired by appropriate different length adjustments for the legs 5. This may be further accommodated by adjustment of the length of the trolley supported beef hook or chain means which carry the upper end of the rack, as will be apparent. The straps 6 are then severally adjusted to support the flank in the specific position found best adapted to produce the most attractive appearance to the beef. The rack is held in this position until the beef is thoroughly chilled, whereupon the rack may be removed and the beef then run into the storage room where it may be held ready for market.

Referring now to the modified construction shown by Figures 6 to 10 inclusive, the form of rack or table 29 here shown is known as a beef cradle owing to its concave or hollow shape. This cradle comprises mainly an oblong frame 30, a flexible web or body part 31 detachably connected thereto, a pair of end lugs 32 for suspending the cradle endwise or for supporting one end from overhead hooks or chains indicated at 33 and legs 34 for supporting the opposite end of frame 30 to which they are foldably connected by pivots 35.

The end bars 36 of said frame are bowed downwardly in order to impart a hollow or cradle-like character to the rack as a whole. In order to accommodate interchangeability or renewal of web members 31, the peripheral frame 30 is provided with a series of holes 37 to receive the correspondingly spaced hooks 38 on the web 31. Although plain legs 34 are shown for this cradle, it is to be understood that legs such as shown on the table 1 may be used if preferred.

The mode of operating this cradle is mainly similar to that for the rack or table 1. Referring particularly to Fig. 10, the side of beef 39 while still suspended from an overhead truck 40 has the cradle 30 applied to the convex or skinned side thereof, said cradle being supported by trucks 40'. In connection with the trucks 40 and 40' suitable chains may be used if desired, as for instance such as indicated at 41, though the particular form of truck and lifting mechanism forms no part of my present invention. The trucks 40 and 41' may be carried on the same rail 42 or if preferred on parallel rails.

Referring to Figures 11 and 12, a chilling room is here shown adapted for placing the racks 1 or cradles 29 horizontally, one above another, in compact arrangement adapted to economize space and facilitate rapid chilling by exposure to a minimum volume of artificially cooled air. Here the room 45, which it is understood may be tightly closed, is provided with a central runway 46, with an overhead trolley 47 indicated by dotted lines running along the center, and with rows of beef chilling compartments, or cells on each side as indicated at 48. These compartments are formed by providing uprights 49 and 50 at the front and rear respectively and spaced apart lengthwise of the passage 46, the width of a rack or cradle. Horizontal guides or slideways 51 are mounted on both sides of said uprights in appropriate spaced relation vertically to accommodate loaded racks or cradles, the longitudinal edges or side rails of which rest slidably thereon.

In Fig. 11 cradles are shown on the left hand side with the beef disposed split side up, while on the right hand side flat tables are shown with the beef disposed split side down. In Fig. 12 cradles are shown with sides of beef arranged substantially as they appear in the chilling room. In transferring a rack or cradle with its load of beef from the overhead trolley to a cell 48, the lower end of the rack is swung laterally and the rack and beef lowered sufficiently to permit the end of the rack to slide inwardly on a pair of guides 51. Then, as the outer end is lowered further the rack is pushed back into place in horizontal position and the trolley connections removed. After the beef is chilled the operation is reversed and the beef is carried away suspended from the hind leg on the trolley and placed in a storage room ready for market. When the cradles 29 are used the beef is given a nearly uniform convex appearance from end to end, due to its settling by gravity into the general shape of the cradle bottom 31 whereon it rests, bone side up. The other form of support 1 permits a little more specific adjustment and determination of the flank shape through the use of the straps 6.

The air in the room 45 is kept cold by any desired means, as for instance chilling coils, not shown, and it is kept agitated and circulating by fans, also not shown.

This method is efficient in many ways, including enhancement of appearance and market value of the product, economy of space for chilling recumbently, minimum waste of chilled air due to circulation in a closed chamber, and requires but little labor to operate.

Although but two specific embodiments of this invention are herein shown and described, it is to be understood that no attempt has been made to show specifically all useful embodiments and that numerous details of the constructions shown may be altered or ommitted without departing from the spirit of this invention as defined by the following claims.

I claim:

1. A beef chilling rack comprising a substantially planar support adapted for sidewise reception of a side of beef and having means to mold the meat, said support having means for adjustable tilting, said means including independent lift connections adapted to accommodate overhead suspension for the corners respectively at one end of the rack and independent ground supports adapted for adjustable elevation for the opposite end corners respectively.

2. A beef chilling rack of the character described comprising a planar frame adapted to receive a side of beef, split side down, and having adjustable length bow-shaped rib-like straps to support the flank.

3. A beef chilling rack of the character described comprising a frame of oblong shape adapted to receive a side of beef, said frame being formed and adapted at one end for overhead suspension and at its other end having a pair of mutually spaced independently adjustable length legs for tilting the rack endwise and sidewise.

4. A beef chilling rack comprising a frame adapted to receive a side of beef, said frame being adapted for variable tilting and having adjustable length supports spaced apart mutually, said supports each comprising a pair of overlapping members, a pair of guide means therefor, and the overlapped parts having complementary cross grooves adapted for selective registry and means to coact with said grooves for securing said sections in the desired registry.

5. The method of treating beef which consists in disposing the side recumbently while still limp on molds and thereby positively imparting artificial form throughout, then chilling the sides as thus disposed and so setting the same rigidly, and finally suspending the same endwise in a cold storage room, whereby the specific molded set is retained until marketed.

Signed at Chicago this 2d day of October, 1928.

HARRY H. McKEE.